Patented Sept. 3, 1946

2,406,878

UNITED STATES PATENT OFFICE 2,406,878

PRINTING INK

Paul Whyzmuzis, Corona, Long Island, N. Y., and Harry Linkletter, Englewood, N. J., assignors to Interchemical Corporation, New York, N. Y., a corporation of Ohio No Drawing. Application July 10, 1943, Serial No. 494,242

3 Claims. (Cl. 106—28)

This invention relates to printing inks, and is directed particularly at a new type of printing ink, characterized by its very rapid drying when exposed to ultra violet light.

The problem of drying inks rapidly has been before the printing ink industry for a considerable number of years, in view of the fact that high speed printing, combined with high quality, is desired. One group of investigators has dropped the typical slow drying inks made with drying oil, and gone to an ink containing a solvent which is substantially non-volatile at ordinary temperatures, but which is volatilizable at tempertures of the order of 150° F.—see Gessler U. S. Patent No. 2,087,190. The use of such inks requires the installation on the press of heaters to heat the paper, and of exhaust fans to remove the vapors and fumes coming from the printed paper, so that, while the inks have been extremely successful in large scale printing and in large scale operations, there still remains the desire to provide a quick drying ink which can be used without the necessity for the installation of large amounts of equipment in connection with any press.

The quick drying properties of tung oil and other oils containing conjugated systems of double bonds (such as dehydrated castor oil and conjugated linseed oils) have made these oils the principal attacking point for investigators interested in producing fast drying inks for quality printing. It has been proposed to dry inks made with such oils as a base by the use of ozone and by the use of ultra violet light. While both of these expedients increase the speed of drying of the ink, neither of them is fast enough to cause the ink to dry sufficiently for handling within the necessary short time, of the order of seconds.

We have discovered that the speed of drying of oils and other binders containing conjugated double bonds, when exposed to ultra violet light, is enormously accelerated by the inclusion in the composition of a small percentage (from about 1 to 10%) of dicinnamal acetone. Inks formulated from oils containing conjugated double bonds and a small percentage of dicinnamal acetone, in addition to the customary additions, have been dried as on coated non-absorbent stocks with ultra violet light in times of the order of a few seconds.

The use of dicinnamal acetone in inks not containing binders with conjugated systems of double bonds does not produce such rapid drying; but such inks, when exposed to ultra violet light, dry much more rapidly than similar inks not containing dicinnamal acetone. The drying of ordinary linseed oil inks, and of solvent inks such as described in U. S. Patent No. 2,087,190, can be hastened by this method.

Typical of our invention are the following:

Example 1.—Wood oil varnish

| | Per cent |
|---|---|
| Lithol barium toner | 28 |
| Oil varnish | 54 |
| Resin varnish | 18 |

The oil varnish is made as follows: 90% raw china-wood oil. Body at 220° C. to a viscosity of 32 poises. Cool to 70° C., and add 5% crude dicinnamal acetone. Then add 5% liquid cobalt drier.

The resin varnish is made as follows:

| | Per cent |
|---|---|
| Zinc resinate | 47.5 |
| Terpenol A #3N (du Pont) | 9.5 | are refluxed at 110° C., and then diluted with

| | Per cent |
|---|---|
| Solvent (petroleum distillate of zero dimethyl sulfate value — boiling range 250-270° C.) | 33.25 |
| Crude dicinnamal acetone is added at 60° C | 5 | and finally

| | |
|---|---|
| Liquid cobalt dryer | 4.75 |

This ink was printed on a non-absorbent clay coated carton stock, and passed through a tunnel where it was exposed to a source of intense ultra violet light (two mercury vapor quarts lamps). The length of time of exposure in the tunnel was two seconds. The ink could be handled on removal from the tunnel, and could be backed up by printing on the other side almost immediately.

Example 2.—Varnish

| | Pounds |
|---|---|
| Ester gum (glycerol-rosin ester) | 50 |
| Rosin | 25 |
| Tung oil | 50 | are heated at 250° C. for 20 minutes; the varnish is reduced with—

| | Pounds |
|---|---|
| Petroleum solvent of Example 1 | 44 |
| Dicinnamal acetone | 5 |

When made into an ink, drying as good as that of Example 1 is obtained. It should be noted that rosin has a conjugated system of double bonds, and thus helps to absorb the ultra violet energy.

Example 3.—Varnish

A satisfactory varnish can also be made from—

|  | Pounds |
|---|---|
| Tung oil | 50 |
| Lead resinate | 50 |
| Petroleum solvent of Example 1 | 66 |
| Dicinnamal acetone | 7½ |

The resin and tung oil are heated as in Example 2.

Example 4.—Resin varnish

|  | Pounds |
|---|---|
| Zinc resinate | 50 | are dissolved in—

| Cinnamic alcohol | 10 |
|---|---|

The solution is reduced with—

| Petroleum solvent as in Example 1 | 35 |
|---|---|
| Dicinnamal acetone | 5 |

These varnishes are used with ordinary pigments in the normal way to make printing ink. Ordinary oxidation catalysts may be added in known manner, as may the various addants widely used to control printing characteristics. While we have shown but one solvent, it has been used only because it is representative of petroleum solvents which do not unduly attack rubber rollers. A wide variety of other solvents may be used, provided they are press-stable, and are rapidly volatilizable from the film at 100–150° C.

Obviously, extensive changes can be made in the scope of the examples, without departing from the scope of the invention, which is defined in the claims.

We claim:

1. A printing ink characterized by improved drying when exposed to ultra violet energy, comprising pigment dispersed in a vehicle capable of being dried by ultra violet energy, and containing a binder having a conjugated system of double bonds, and containing from about 1 to 10% of dicinnamal acetone, whereby drying by ultra violet is substantially accelerated.

2. A printing ink characterized by improved drying when exposed to ultra violet energy, comprising pigment dispersed in a vehicle capable of being dried by ultra violet energy, and consisting at least in part of tung oil, and containing from about 1 to 10% of dicinnamal acetone, whereby drying by ultra violet is substantially accelerated.

3. A printing ink characterized by improved drying when exposed to ultra violet energy, comprising pigment dispersed in a vehicle capable of being dried by ultra violet energy, and consisting at least in part of rosin, and containing from about 1 to 10% of dicinnamal acetone, whereby drying by ultra violet is substantially accelerated.

PAUL WHYZMUZIS.
HARRY LINKLETTER.